United States Patent [19]
Iwadachi

[11] Patent Number: 6,164,524
[45] Date of Patent: Dec. 26, 2000

[54] HIP-BONDED BODY AND METHOD OF PRODUCING THE SAME

[75] Inventor: Takaharu Iwadachi, Handa, Japan

[73] Assignee: NGK Insulators, Ltd., Nagoya, Japan

[21] Appl. No.: 09/243,664

[22] Filed: Feb. 2, 1999

[30] Foreign Application Priority Data

| Feb. 5, 1998 | [JP] | Japan | 10-024795 |
| Oct. 16, 1998 | [JP] | Japan | 10-294340 |

[51] Int. Cl.$^7$ .......................... B23K 20/00; B23K 28/00
[52] U.S. Cl. ........................................... 228/193; 228/194
[58] Field of Search ..................................... 228/193, 194

[56] References Cited

FOREIGN PATENT DOCUMENTS

| 0 104 711 | 4/1984 | European Pat. Off. . |
| 0 856 374 A1 | 8/1998 | European Pat. Off. . |
| 07120600 | 12/1995 | Japan . |
| 10-211572 | 8/1998 | Japan . |
| 1 053 456 | 1/1967 | United Kingdom . |

OTHER PUBLICATIONS

T. Kuroda et al: "Development of Joining Technology for Be/Cu–alloy and Be/SS by HIP" Oct. 1997.

T. Kuroda et al: "Development of joining technology for BE/Cu–alloy and Be/SS by HIP" Journal of Nuclear Materials (Conf. Prof. Icfrm–8, Sendai JP, Oct. 26–31 1997), vol. 258–264, IX002103696 Amsterdam.

M. Araki et al: "Manufacturing and testing of a BE/OFH-C–Cu divertor module" Journal of Nuclear Materials (Conf. Prof. Icfrm–7, Obninsk RU, Sep. 25–29 1995), vol. 233–237, No. Part A, 1996 pp. 632–637, XP002103697.

*Primary Examiner*—Patrick Ryan
*Assistant Examiner*—Zidia T. Pittman
*Attorney, Agent, or Firm*—Burr & Brown

[57] ABSTRACT

A HIP-bonded body of a beryllium member and a copper alloy member. The beryllium member comprises on its one side a thin layer of titanium, chromium, molybdenum or silicon as a diffusion inhibition layer. The beryllium member is HIP-bonded to the copper alloy member, with the diffusion inhibition layer situated between the two members. A layer of pure copper or pure nickel may be formed on the diffusion inhibition layer, as a bonding promotion layer. An aluminum layer may be formed on the surface of the beryllium member, as a stress relaxation layer on which the diffusion inhibition layer is formed. The bonded body has excellent bonding strength and thermal cycle resistance property, and can be obtained in economical manner.

10 Claims, No Drawings

HIP-BONDED BODY AND METHOD OF PRODUCING THE SAME

BACKGROUND OF THE INVENTION

1. Field of the Invention

This invention relates to a HIP-bonded body comprised of a beryllium member and a copper member, as well as a method of producing the same.

2. Description of the Related Art

Recently, in various application fields such as neutron reflector of material testing reactor, neutron accelerator and the like, beryllium is considered to be a prominent material in view of its high neutron reflection ratio. While beryllium itself has a relatively good thermal conductivity, when a beryllium member is used under a severe thermal load condition, the beryllium member is often bonded to a copper alloy member to provide an even higher thermal conductivity. As a method for bonding beryllium member and copper alloy member, HIP bonding method is considered to be a highly probable candidate.

Heretofore, when a beryllium member and a copper alloy member are bonded by HIP method, it has been considered necessary to carry out the HIP process under a high temperature of not less than 700° C. This is because there usually exists a beryllium oxide film on the beryllium surface, and a desired bonding by interdiffusion of beryllium and copper alloy is not sufficiently achieved unless the beryllium and the copper alloy members are heated to a temperature of not less than 700° C. With such a bonding method, however, there may be instances wherein copper and beryllium members are separated from each other at their interfaces due to heat cycles during operation. Such separation is often due to the presence of brittle intermetallic compounds, such as $Be_2Cu$, BeCu, which tend to be formed at the interface between beryllium and copper members under the high temperature condition. Moreover, the HIP bonding process performed under a high temperature condition is not very appropriate in view of cost and energy consumption.

From such viewpoint, it would be feasible to remove the oxide on beryllium surface in vacuum atmosphere and subsequently form a pure copper film on the purified beryllium surface, by ion plating and the like. In this case, it would be possible to achieve a strong bonding of beryllium and copper alloy members even under a low HIP temperature of 400 to 550° C., since oxides are excluded at the interface between the pure copper and beryllium members and intermetallic compounds are not formed at the interface between the two members. However, even when the beryllium and copper alloy members are bonded to each other in the above-mentioned manner, when the bonded body is used under a temperature of not less than 400° C, brittle intermetallic compounds of beryllium and copper tend to be formed at the interface where intermetallic compounds had not been formed during the bonding process, with the result that the bonded body may be broken at the interface.

To eliminate the above-mentioned problems, the beryllium member may be provided with a soft metal layer, e.g., an aluminum layer, which does not form intermetallic compounds with beryllium, such that the soft metal layer is bonded to the copper alloy member. On the other hand, however, when an aluminum layer is bonded to the copper alloy member, a satisfactory bonding may not be achieved due to brittle compounds of aluminum and copper which are formed at the interface between the copper alloy member and the aluminum layer. Therefore, in this case, it is important to interpose an aluminum-beryllium diffusion inhibition layer such as titanium, at the interface between the aluminum layer and the copper alloy member. In other words, it would be necessary to provide an aluminum intermediate layer for the beryllium member and a titanium intermediate layer for the copper alloy member. However, even when the intermediate layers such as aluminum and titanium layers are provided for the beryllium member and copper alloy member, respectively, it is still difficult to obtain a strongly bonded state because aluminum and titanium are active metals and their surfaces thus tend to be readily oxidized.

Moreover, when a metallic foil is used as an intermediate layer in a conventional manner, it is difficult or practically impossible to obtain a strongly bonded state as a result of oxide films on its surfaces. Also, when the metallic foil is applied to relatively complex structural member, the metallic foil tends to be dislocated relative to the beryllium member or copper alloy member or wrinkles may occur, even when the metal foil is combined with titanium foil or copper foil, so that a reliable bonding is still difficult to achieve.

DISCLOSURE OF THE INVENTION

The present invention serves to solve the above-mentioned problems. It is therefore an object of the present invention to provide a novel HIP-bonded body comprised of a beryllium member and a copper alloy member, as well as a method for manufacturing the same, wherein the beryllium member and the copper alloy member are bonded to each other by a HIP process under a relatively low temperature condition so that brittle compounds are prevented from being formed during the bonding stage or by a heat cycle during the operation, to thereby maintain a strongly bonded state of the bonded body.

The inventor conducted thorough research and investigations seeking for solutions of the above-mentioned problems, and obtained the following recognition.

(1) It had been conventionally considered necessary that, from the viewpoint of stress relaxation at the interface between beryllium member and copper alloy member, a diffusion inhibition layer comprises a soft metal, such as aluminum. However, a hard metal such as chromium or molybdenum can achieve a sufficient function as a diffusion inhibition layer when it has a small thickness.

(2) Nevertheless, when there exists an oxide film on the beryllium surfaces before formation of a hard thin film made of chromium on the beryllium surface, it is difficult o obtain a sufficient bonding strength and it is thus necessary to remove the oxide film from the beryllium surface in advance.

(3) In this way, a beryllium-copper alloy HIP-bonded body having sufficient bonding strength and thermal cycle resistance is obtained. These properties of the bonded body can be further improved in view of application wherein the bonded body is repeatedly subjected to an excessive thermal load, by providing a relatively thick aluminum layer as a stress relaxation layer having a sufficient resistance to the thermal load.

Based on the above-mentioned recognition, one aspect of the present invention resides in a HIP-bonded body comprising a beryllium member and a copper alloy member, said beryllium member comprising on its one side a thin layer of titanium, chromium, molybdenum or silicon as a diffusion inhibition layer, said beryllium member being bonded to said copper alloy member, with said diffusion inhibition layer situated between said members.

Another aspect of the present invention resides in a method of producing HIP-bonded body comprised of a beryllium member and copper alloy member, comprising the steps of: forming a thin layer of titanium, chromium, molybdenum or silicon as a diffusion inhibition layer on one side of the beryllium member; and bonding the beryllium member to the copper alloy member by a HIP process, with the diffusion inhibition layer situated between the two members.

Advantageously, the diffusion inhibition layer comprises a titanium layer having a thickness of approximately 0.5 to 50 µm, a chromium layer having a thickness of approximately 0.1 to 5 µm, a molybdenum layer having a thickness of approximately 0.5 to 20 µm, or a silicon layer having a thickness of approximately 0.5 to 10 µm.

Advantageously, the method of the present invention further comprises a step of forming a layer of pure copper or pure nickel, as a bonding promotion layer on said diffusion inhibition layer. Preferably, the bonding promotion layer has a thickness of approximately 5 to 500 µm.

Advantageously, the method of the present invention further comprises the step of forming an aluminum layer as a stress relaxation layer, on the surface of the beryllium member, wherein the diffusion inhibition layer is formed on the stress relaxation layer. Preferably, the stress relaxation layer has a thickness of approximately 5 µm to 2.5 µmm.

According to the present invention, it is highly preferred that the HIP bonding is performed under a temperature of approximately 400 to 650° C., and a pressure of approximately 20 to 300 MPa.

DETAILED DESCRIPTION OF THE INVENTION

The invention will be explained below in further details.

According to the present invention, a hard metal film of Ti, Cr, Mo or Si is formed on a surface of beryllium member by physical vapor deposition (PVD) method or thermal spraying process, after enhancing the activity of the beryllium surface to improve the bonding strength between the surface of the beryllium member and the hard metal film. When PVD method is used for forming the hard metal film, the activity of the beryllium surface can be enhanced by removing oxide films from the beryllium surface under a vacuum atmosphere. The preferred means for removing the oxide films is argon sputtering, ion bombardment or the like. Alternatively, when a thermal spraying process is used for forming the hard metal film, the activity of the beryllium surface can be enhanced by applying a conventional blasting treatment, or an acid-cleaning/degreasing treatment by means of hydrofluoric acid, sulfuric acid, nitric acid, phosphoric acid, chromic acid or the like.

The titanium layer, chromium layer, molybdenum layer or silicon layer as beryllium-copper diffusion inhibition layer is formed on the activated surface of the beryllium. The preferable thickness of the beryllium-copper diffusion inhibition layer is approximately 0.5 to 50 µm for titanium layer, approximately 0.1 to 5 µm for chromium layer, approximately 0.5 to 20 µm for molybdenum layer, and approximately 0.5 to 10 µm for silicon layer. This is because a film thickness of these elements below the respective lower limits does not allow a desired diffusion inhibition effect while a film thickness above the respective upper limits gives rise to a tendency of the bonding interface to become brittle and to be readily broken.

Advantageously, vacuum evaporation process, sputtering process, ion plating process or the like is applied as the PVD method for forming the diffusion inhibition layer. The magnitude of vacuum during the PVD process is preferably not more than $1\times10^{-4}$ Torr, since otherwise the metal elements may be readily oxidized during the PVD process, making it difficult to obtain satisfactory films. Also, it is highly preferred that the temperature of the substrate is preferably raised to 200 to 400° C. from the viewpoint of improving adhesion of films due to removal of impurities or absorbed gas on the bonding surface of the material, and thermal stress relaxation.

Alternatively, when thermal spraying is applied to form the diffusion inhibition layer, vacuum plasma spraying (VPS) process, low-pressure plasma spraying (LPPS) process, or Al-wire thermal spraying process is preferably applied under atmospheric or inert-gas environment. When VPS or LPSS is applied for the thermal spraying, cathode transfer arc cleaning process may be applied to the above-mentioned activation of the beryllium surface, wherein a voltage is applied across the plasma torch and the material to be formed with the film, so as to form microscopic cathode arc spots on the surface of the material, and thereby remove the oxide films on the material surface.

Subsequently, a bonding promotion layer comprising a pure copper layer or pure nickel layer is formed on the diffusion inhibition layer by PVD or thermal spraying process, if necessary. If a beryllium member would be bonded to a copper alloy member immediately after formation of a Be-Cu diffusion inhibition layer, such as a titanium-, chromium-, molybdenum-, or silicon-layer, on the beryllium member, without forming the pure copper layer or pure nickel layer, an oxide film of titanium, chromium, molybdenum or silicon would be formed as soon as the beryllium member is taken out of a vacuum chamber into an aµmospheric environment, so that it would be difficult to achieve a satisfactory bonded state of the diffusion inhibition layer with the copper alloy member. On the contrary, when the beryllium member is bonded to the copper alloy member with a pure copper layer or pure nickel layer on the Be-Cu diffusion inhibition layer of the beryllium member, even if their oxides are formed on the Be-Cu diffusion inhibition layer, a strongly bonded body is obtained even under a relatively low temperature condition of 400° C. to 650° C., because pure copper or pure nickel has a sufficient affinity with the copper alloy with which it is to be bonded. Therefore, it is highly recommended that such pure copper or pure nickel layer is formed on the diffusion inhibition layer, particularly when oxidation of the surface of Be-Cu diffusion inhibition layer, such as titanium, chromium, molybdenum, silicon or the like, must be taken into consideration.

Also, when the temperature is raised during use of the HIP-bonded body which is not formed with the pure copper or pure nickel layer on the diffusion inhibition layer, separation may occur at the interface between the copper alloy member and the hard metal layer such as titanium, chromium, molybdenum, silicon or the like, due to the difference of coefficient of thermal expansion therebetween. By interposing a pure copper layer or pure nickel layer is between the copper alloy member and the hard metal layer, the pure copper layer or pure nickel layer serves effectively to relax the stress due to the differential coefficient of thermal expansion, and to positively prevent occurrence of separation at the interface between the copper alloy member and the hard metal layer.

Preferably, the pure copper layer or pure nickel layer has a thickness which is approximately 5 to 500 µm. It has been found that the desired effect is difficult to achieve when the thickness of the bonding promotion layer is less than approximately 5 μm, while a thickness in excess of approximately 500 μm is disadvantageous from economical viewpoint.

The beryllium member which has been formed with the diffusion inhibition layer, and optionally with the pure copper layer or pure nickel layer, is bonded to the copper alloy member by HIP process, with the side of such intermediate layers of the beryllium member situated adjacent to the copper alloy member. The HIP process can be performed under a relatively low temperature of approximately 400 to 650° C., which is much lower than conventional HIP temperature, and under a bonding pressure of approximately 20 to 300 MPa. Copper alloy particularly suitable for carrying out the present invention may be alumina dispersion-strengthened copper (DSCu), chromium-zirconium, and beryllium copper alloy according to ASTM C17510 or C17500, or the like.

In the manner described above, according to the invention, a HIP-bonded body comprising a beryllium member and a copper alloy member and having a high bonding strength can be stably obtained without formation of brittle compounds.

Incidentally, it should be noted that there is a difference in coefficient thermal expansion between the beryllium member and the hard metal layer such as titanium, chromium, molybdenum or silicon layer. Thus, when the HIP-bonded body is to be used under a high temperature condition, it is important to positively avoid separation of the beryllium member and the copper alloy member at the interface between the beryllium member and the hard metal layer, due to the differential coefficient of thermal expansion. To this end, it is advantageous to form an aluminum layer as a stress relaxation layer between the beryllium member and the hard metal layer. Aluminum is a relatively soft metal and is thus useful for relaxation of the stress due to the differential coefficient of thermal expansion. Moreover, aluminum effectively contributes as a diffusion inhibition layer between beryllium and copper.

The aluminum layer can be formed on the active surface of beryllium member which has been subjected to removal of oxide films, also by PVD process or thermal spraying process, before formation of the hard metal layer such as titanium, chromium, molybdenum or silicon layer. The thickness of the aluminum layer for ordinary use is 5 to 200 μm. When, however, an excessive thermal load is repeatedly applied to the HIP-bonded body in use, the thickness of the aluminum layer is preferably not less than 200 μm. On the other hand, in many instances, a thickness in excess of 2.5 mm is unnecessary from economical consideration and since a further improvement in terms of stress relaxation cannot be achieved. Hence, the upper limit of the thickness of the aluminum layer is not more than 2.5 mm. A preferred range of the thickness of the aluminum layer is 0.5 to 1.5 mm.

As mentioned above, the aluminum layer may be formed by PVD process. However, it may be economically disadvantageous to apply PVD process for forming an aluminum layer having a thickness of not less than 200 μm, since not only a significant length of time is required to complete formation of the layer, but also there must be used a forming device which is of large scale and complicated in structure. Moreover, in many instances, PVD process does not practically allow formation of an aluminum layer having a thickness of not less than 500 μm. Therefore, it is preferred that a thermal spraying process is applied to form an aluminum layer having a thickness not less than 200 μm.

When an aluminum layer is formed on the beryllium surface by thermal spraying process, such as VPS or LPPS process, aluminum powder as raw material is jetted onto the beryllium surface while being melted by plasma. The VPS or LPSS may also be applied to form a thin layer of titanium, chromium, molybdenum or silicon, on the aluminum layer on the beryllium surface, and/or to form pure copper layer or pure nickel layer on the thin layer. In this instance, it is possible to successively form the desired intermediate layers simply by changing the raw material powder. When the intermediate layers are successively formed by VPS or LPSS process, it may be appropriate to perform cleaning of the surface of one layer by cathode transfer arc process, before formation of another layer thereon.

When wire thermal spraying process is applied for formation of the aluminum layer, it is necessary to apply VPS or LPSS process when the diffusion inhibition layer in the form of titanium, chromium, molybdenum or silicon layer, and/or the bonding promotion layer in the form of pure copper layer or nickel layer are formed by thermal spraying. In this case, the surface of the aluminum layer must be cleaned to remove oxides and/or fumes therefrom by the above-mentioned cleaning means.

The surface of aluminum layer formed by thermal spraying process is generally rouge, and it is thus preferred to smoothen the surface of the aluminum layer formed by thermal spraying, by a mechanical process such as grinding or polishing, prior to cleaning and successive formation of the diffusion inhibition layer of titanium, chromium, molybdenum or silicon, or bonding promotion layer in the form of pure copper layer or pure nickel layer. When the surface of the aluminum layer is smoothened, the diffusion inhibition layer of titanium, chromium, molybdenum or silicon, or bonding promotion layer in the form of pure copper layer or pure nickel layer may be suitably formed not only by thermal spraying process, but also by PVD process.

As above-mentioned, it is possible to obtain a HIP-bonded body with an improved stress relaxation property by successively forming, on the surface of the beryllium member, an aluminum layer, a diffusion inhibition layer and a bonding promotion layer.

The present invention will be further explained below with reference to experimental data.

Experiment1

Beryllium and various copper alloys were used for preparing specimens each having the size of Φ50 mm×50mm. Intermediate layers were formed on the beryllium surface (except specimens 1 and 2) under the conditions shown in Table 1. Each specimen was then placed in a pure copper casing, and bonded by HIP process under the conditions shown in Table 1.

Then, shearing test pieces having the size of Φ10 mm×20 mm and including the regions on both sides of the bonded interface were cut off from the so-obtained HIP-bonded bodies, by electric discharge machining, to measure the shear strength of each test piece. Also, the amounts of the intermetallic compounds formed at the bonding interfaces were measured by optical microscope. The results of the above-mentioned tests are also shown in Table 1.

TABLE 1

| No. | oxide removing process | intermediate layers and method of forming the same | HIP bonding process temp. × hour (° C. × h) | pressure (MPa) | bonded state | shear strength (MPa) | thickness of intermediate compound in bonding interface (μm) |
|---|---|---|---|---|---|---|---|
| 1 | — | — | 550 × 4 | 160 | unbonded | — | intermetallic compound was not found |
| 2 | — | — | 700 × 2 | 150 | bonded | 130 | 20 |
| 3 | argon sputtering | Be/Al(100 μm)-Ti(50 μm)-Cu(200 μm)/DSCu (vacuum evaporation) | 550 × 2 | 140 | bonded | 120 | intermetallic compound was not found |
| 4 | — | Be/Al(100 μm)-Ti(50 μm)-Cu(200 μm)/DSCu (vacuum evaporation) | 550 × 2 | 140 | unbonded | — | intermetallic compound was not found was not found |
| 5 | argon sputtering | Be/Cr(1 μm)-Cu(200 μm)/DSCu sputtering | 580 × 4 | 120 | bonded | 130 | intermetallic compound was not found |
| 6 | argon sputtering | Be/Mo(3 μm)-Cu(100 μm)/DSCu (sputtering) | 580 × 2 | 140 | bonded | 140 | intermetallic compound was not found |
| 7 | argon ion bombardment | Be/Ti(10 μm)-Cu(250 μm)/DSCu (ion plating) | 500 × 4 | 140 | bonded | 115 | intermetallic compound was not found |
| 8 | argon sputtering | Be/Mo(3 μm)-Cu(100 μm)/DSCu (vacuum evaporation) | 550 × 2 | 140 | bonded | 125 | intermetallic compound was not found |

As can be appreciated from Table 1 above, in the case of HIP-bonded bodies according to the invention, brittle intermetallic compounds are not formed, and it has been confirmed that a high bonding strength is achieved. Moreover, the HIP-bonded bodies according to the invention were heated to 350° C., assuming an actual application temperature of bonding body. As a result, it has been confirmed that there is little decrease in the bonding strength.

Experiment2

Beryllium and various copper alloys were used for preparing specimens each having the size of 50 mm×50 mm×10 mm. Intermediate layers were formed on the beryllium surface under the conditions shown in Table 2. Each specimen was then placed in a stainless steel casing, and bonded by HIP process under the conditions shown in Table 2.

Then, shearing test pieces having the size of 4 mm×4 mm in cross-section and including the regions on both sides of the bonded interfaces were cut off from the so-obtained HIP bonding bodies, by electric discharge machining, and the shear faces were polished before measurement of the four-point bending strength. Also, the HIP-bonded bodies according to the invention were subjected to repeated thermal cycle test between a high temperature of 380° C. and a low temperature of −196° C. (liquid nitrogen temperature) in order to evaluate its heat cycle resistant property. The results of the above-mentioned tests are also shown in Table 2.

TABLE 2

| No. | intermediate layers and method of forming the same | HIP bonding process temp. × hour (° C. × h) | pressure (MPa) | shear strength (MPa) | thermal cycles for delamination (times) |
|---|---|---|---|---|---|
| 1 | Be/Al(100 μm evaporation)-Ti(50 μm evaporation)-Cu(200 μm evaporation)/DSCu | 580 × 4 | 140 | 105 | 850 |
| 2 | Be/Al(20 μm evaporation)-Ti(20 μm evaporation)-Cu(100 μm evaporation)/DSCu | 580 × 4 | 140 | 100 | 720 |
| 3 | Be/Al(800 μm low pressure plasma spraying)-Ti(20 μm low pressure plasma spraying)-Cu(20 μm low pressure plasma spraying)/DSCu | 580 × 4 | 140 | 108 | 3000 (not delaminated) |
| 4 | Be/Al(600 μm wire thermal spraying)-Ti(20 μm evaporation)-Cu(20 μm evaporation)/DSCu | 600 × 4 | 150 | 110 | 2850 |
| 5 | Be/Al(1200 μm wire thermal spraying)-Ti(10 μm evaporation)/DSCu | 600 × 4 | 160 | 125 | 3000 (not delaminated) |
| 6 | Be/Al(1300 μm low pressure plasma spraying)-Ti(10 μm low pressure evaporation)-Cu(50 μm low pressure plasma spraying)/DSCu | 550 × 4 | 140 | 98 | 3000 (not delaminated) |
| 7 | Be/Al(1000 μm wire thermal spraying)-Ti(10 μm evaporation)-Ni(50 μm evaporation)/DSCu | 580 × 4 | 140 | 103 | 2700 |
| 8 | Be/Al(1000 μm low pressure plasma spraying)-Cr(2 μm evaporation)-Ni(50 μm evaporation)/CuCrZr | 550 × 4 | 140 | 112 | 2660 |
| 9 | Be/Al(800 μm low pressure plasma spraying)-Mo(10 μm low pressure plasma spraying)-Cu(50 μm low pressure plasma spraying)/CuCrZr | 580 × 4 | 150 | 102 | 2780 |
| 10 | Be/Al(800 μm wire thermal spraying)-Si(5 μm in evaporation)-Cu(50 μm evaporation)/CuCrZr | 550 × 4 | 150 | 103 | 2660 |
| 11 | Be/Al(800 μm plasma spraying)-Ti(15 μm low pressure plasma spraying)-Ni(20 μm m low pressure plasma spraying)/CuCrZr | 610 × 4 | 140 | 115 | 3000 (not delaminated) |

As can be appreciated from Table 2 above, the HIP-bonded bodies formed with a thick aluminum layer as a stress relaxation layer has excellent bonding property and heat cycle resistant property, so that separation does not occur even after 3000 times heat cycles. It should be noted that No. 5 specimen without a pure copper layer or pure nickel layer exhibited excellent bonding property and heat cycle resistant property of substantially the same level as specimens which have been formed with a bonding promotion layer.

It will be appreciated from the foregoing description that the present invention makes it possible to stably obtain a HIP-bonded body of beryllium member and copper alloy member, having high bonding strength and satisfactory heat cycle resistant property, without formation of brittle composites at the bonding interface not only during the HIP bonding process and also in operation of the bonded body. The HIP bonding according to the present invention can be performed under a considerably low temperature range of approximately 400° C. to approximately 650° C. as compared to conventional art, which is highly advantageous from the viewpoint of energy saving and cost reduction.

What is claimed is:

1. A method of producing HIP-bonded body comprised of a beryllium member and copper alloy member, comprising the steps of:

forming a thin layer of titanium, chromium, molybdenum or silicon as a diffusion inhibition layer on one side of said beryllium member; and bonding said beryllium member to said copper alloy member by a HIP process, with said diffusion inhibition layer situated between said members.

2. The method of claim 1, wherein said diffusion inhibition layer comprises a titanium layer having a thickness of approximately 0.5 to 50 μm.

3. The method of claim 1, wherein said diffusion inhibition layer comprises a chromium layer having a thickness of approximately 0.1 to 5 μm.

4. The method of claim 1, wherein said diffusion inhibition layer comprises a molybdenum layer having a thickness of approximately 0.5 to 20 μm.

5. The method of claim 1, wherein said diffusion inhibition layer comprises a silicon layer having a thickness of approximately 0.5 to 10 μm.

6. The method of claim 1, further comprising the step of forming a layer of pure copper or pure nickel, as a bonding promotion layer on said diffusion inhibition layer.

7. The method of claim 6, wherein said bonding promotion layer has a thickness of approximately 5 to 500 μm.

8. The method of claim 1, further comprising the step of forming an aluminum layer as a stress relaxation layer, on the surface of said beryllium member, wherein said diffusion inhibition layer is formed on said stress relaxation layer.

9. The method of claim 8, wherein said stress relaxation layer has a thickness of approximately 5 μm to 2.5 mm.

10. The method of claim 1, wherein said HIP bonding is performed under a temperature of approximately 400 to 650° C., and a pressure of approximately 20 to 300 MPa.

* * * * *